July 28, 1959 — M. K. WINGATE — 2,896,362
POISON BAIT MOUSE AND RAT EXTERMINATOR
Filed Aug. 13, 1958
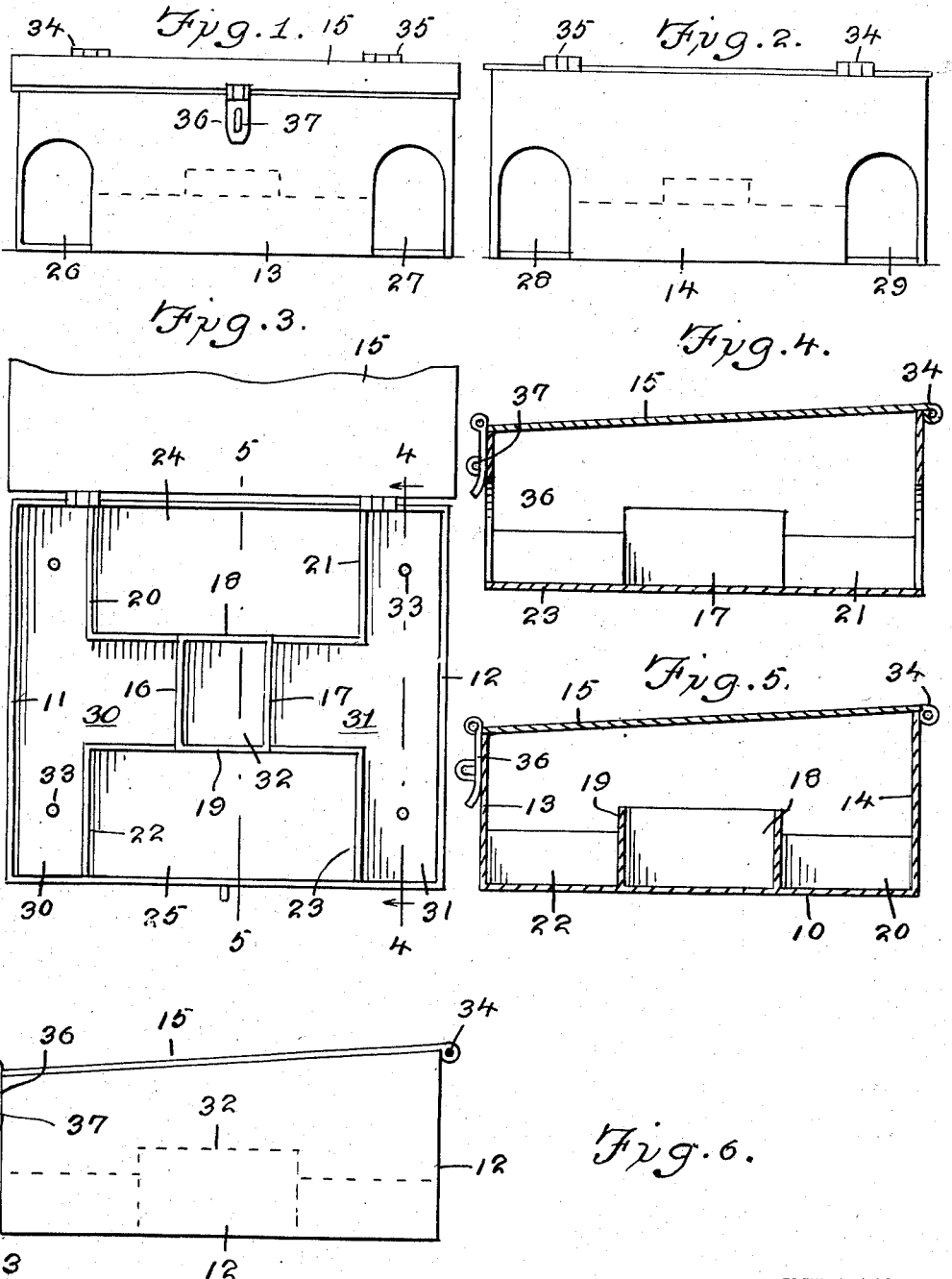
INVENTOR.
Mary K. Wingate
BY Victor J. Evans & Co.
ATTORNEYS

United States Patent Office 2,896,362
Patented July 28, 1959

2,896,362

POISON BAIT MOUSE AND RAT EXTERMINATOR

Mary K. Wingate, Cincinnati, Ohio

Application August 13, 1958, Serial No. 754,794

1 Claim. (Cl. 43—131)

This invention relates to mouse and rat traps particularly of the type using poison bait, and in particular a casing having poison bait hoppers therein with openings providing doors for admitting animals to areas around the hoppers and with feed doors providing communicating means with the hoppers so that animals entering the casing may take feed from the hopper or hoppers and pass from the casing.

The purpose of this invention is to provide a feeder for poison bait wherein mice, rats and the like may enter the feeder, eat the poison bait and escape from the feeder and wherein openings of the feeder are so formed that it is impossible for baby chicks, fowl, and other stock to enter the feeder.

In the conventional method of feeding poison bait food containing the poison is placed in trays or other open receptacles and chickens, cats, dogs, and the like eat the bait and are killed thereby. With this thought in mind this invention contemplates a poison bait feeder in which the feed is accessible to rats, mice, and the like but is not accessible to baby chicks, cats, dogs, and other domestic animals.

The object of this invention is, therefore, to provide a poison bait feeder in which the poison feed is accessible only to rats, mice, and other similar rodents.

Another object of the invention is to provide a poison bait feeder in which the feed is readily replenished.

Another important object of the invention is to provide a poison bait feeder in which the rodents have a desire to leave the feeder before dying.

A further object of the invention is to provide a poison bait feeder in which the poison feed is readily accessible to mice, rates, and the like but is inaccessible to chickens, cats, dogs, and other domestic animals, in which the feeder is of a simple and economical construction.

With these and other objects and advantages in view the invention embodies a casing having entrance openings in walls thereof with a feed hopper or with hoppers for poison feed installed therein wherein the poison feed is accessible to animals entering the feeder or casing thereof.

Other features and advantages of the invention will appear from the following description taken in connection with the drawings, wherein:

Figure 1 is a front elevational view showing the improved poison bait feeder with a water container therein shown in broken lines.

Figure 2 is a view similar to Figure 1 looking toward the opposite side of the feeder.

Figure 3 is a plan view of the feeder with the cover in the open position and with part of the cover broken away.

Figure 4 is a cross section through the feeder taken on line 4—4 of Figure 2 with the water container and poison bait hopper shown in elevation.

Figure 5 is a similar view showing a cross section through the center of the poison bait feeder being taken on line 5—5 of Figure 2.

Figure 6 is a side elevational view of the feeder with the water container and poison bait hoppers shown in broken lines.

In the design illustrated in Figures 1 to 6 inclusive, the casing forming the feeder is provided with a base 10 having upwardly extended end walls 11 and 12, a front wall 13, a rear wall 14, and a cover 15, a center compartment providing a water container having end walls 16 and 17 and side walls 18 and 19 and, as shown in Figure 3 the side walls are extended to meet intermediate end walls 20 and 21 on one side and 22 and 23 on the opposite side thereby providing compartments 24 and 25 for retaining poison feed.

The front wall 13 is provided with doors or openings 26 and 27 and the rear wall 14 is provided with similar openings 28 and 29 and through these openings rats, mice, and the like pass into end areas 30 and 31 from which they may take feed from the bins or compartments, 24 and 25, drink water from the center receptacle or tank 32 and pass out of one of the openings. Lower surfaces of the end areas 30 and 31 are provided with drain holes 33 whereby the areas at the ends of the casing may be drained continuously.

The parts are secured together by brazing, welding, or the like and as shown particularly in Figures 4 and 5 the cover 15 is secured to the upper edge of the rear wall 14 by hinges 34 and 35 and a latch 36 is positioned over a hasp 37 by which the cover may be retained in a closed position and, if desired, a lock may be placed through the hasp.

The casing, and parts thereof, may be formed of plastic or other suitable material and may be transparent, opaque, or translucent.

It will be understood that other changes, within the scope of the appended claims, may be made in the design and arrangement of the parts without departing from the spirit of the invention.

What is claimed is:

In a poison bait rodent exterminator, the combination which comprises a base, front, rear, and end walls extended upwardly from the base, the front and rear walls having openings extended therethrough providing passages for rodents, a water tank having side and end walls positioned on the center of the base and with the walls thereof extended upwardly from the base to points spaced downwardly from upper edges of the front, rear and end walls extended upwardly from the base, the side walls of the water tank being extended beyond the end walls thereof, intermediate end walls positioned between the end walls of the water tank and end walls extended upwardly from the base and connecting the ends of the side walls of the water tank to the front and rear walls extended upwardly from the base, the upper edges of the portions of the side walls of the tank being extended beyond the end walls thereof and the intermediate end walls being spaced downwardly from the upper edges of the walls of the tank, a cover hinged to the rear wall and extended over compartments formed by the said walls, and a latch for securing the cover in the closed position.

References Cited in the file of this patent

UNITED STATES PATENTS

| | | |
|---|---|---|
| 1,086,610 | Nunes | Feb. 10, 1914 |
| 1,309,606 | Bartholemew | July 15, 1919 |
| 2,635,382 | Kuntz | Apr. 21, 1953 |
| 2,714,780 | Glover | Aug. 9, 1955 |